(12) United States Patent
Hayes et al.

(10) Patent No.: US 10,794,785 B2
(45) Date of Patent: Oct. 6, 2020

(54) PRESSURE INDICATING MECHANICAL TEE

(71) Applicants: Scott Hayes, Grand Prairie, TX (US); Jerry Minter, Irving, TX (US)

(72) Inventors: Scott Hayes, Grand Prairie, TX (US); Jerry Minter, Irving, TX (US)

(*) Notice: Subject to any disclaimer, the term of this patent is extended or adjusted under 35 U.S.C. 154(b) by 467 days.

(21) Appl. No.: 15/464,108

(22) Filed: Mar. 20, 2017

(65) Prior Publication Data

US 2018/0266912 A1   Sep. 20, 2018

(51) Int. Cl.

| F16L 41/12 | (2006.01) |
| G01L 19/00 | (2006.01) |
| G01L 7/16 | (2006.01) |
| F16L 41/00 | (2006.01) |
| A62C 37/50 | (2006.01) |
| A62C 35/68 | (2006.01) |
| A62C 35/64 | (2006.01) |

(52) U.S. Cl.
CPC ........ *G01L 19/0038* (2013.01); *F16L 41/008* (2013.01); *F16L 41/12* (2013.01); *G01L 7/163* (2013.01); *G01L 7/166* (2013.01); *A62C 35/64* (2013.01); *A62C 35/68* (2013.01); *A62C 37/50* (2013.01)

(58) Field of Classification Search
CPC ......... F16L 41/06; F16L 41/12; F16L 41/008; A62C 37/50
See application file for complete search history.

(56) References Cited

U.S. PATENT DOCUMENTS

| 1,697,344 A * | 1/1929 | Grant | G01F 1/36 |
| | | | 73/861.61 |
| 3,385,112 A * | 5/1968 | Pruitt | G01M 15/106 |
| | | | 73/756 |
| 3,643,986 A | 2/1972 | Allan | |
| 3,694,009 A | 9/1972 | Phillip | |
| 3,954,288 A * | 5/1976 | Smith | F16L 1/26 |
| | | | 285/93 |

(Continued)

FOREIGN PATENT DOCUMENTS

| DE | 102016114565 A1 * | 2/2018 | ............ F16L 41/008 |
| EP | 3301342 A1 * | 4/2018 | ............... E03B 7/07 |

(Continued)

*Primary Examiner* — David Bochna
(74) *Attorney, Agent, or Firm* — Law Office of Jeff Williams PLLC; J. Oliver Williams

(57) ABSTRACT

A device and method for the visual inspection of the existence of pressure within a branch line of pipe is described. A mechanical tee includes a collar portion configured to extend around a pipe. The collar portion defines an axis and includes one or more fasteners to secure the tee to the pipe. A neck portion is coupled to the collar portion. The channel of the neck portion is in fluid communication with the interior of the pipe. A seal is used to prevent leakage between the pipe and the mechanical tee. A pressure indicating device is in fluid communication with the channel of the neck portion and configured to provide a visual indication of the pressure level in the channel. The pressure indicating device may optionally include electrical contacts to communicate with a monitoring system to discern and track the pressure levels in the channel.

13 Claims, 4 Drawing Sheets

(56) References Cited

U.S. PATENT DOCUMENTS

| | | | | |
|---|---|---|---|---|
| 4,534,224 | A | * | 8/1985 | Raftis .................... G01L 7/022 73/114.51 |
| 4,840,068 | A | * | 6/1989 | Mayhew, Jr. ....... G01L 19/0023 73/706 |
| 5,054,512 | A | * | 10/1991 | Jiles ...................... F16L 41/06 137/317 |
| 5,058,620 | A | * | 10/1991 | Jiles ...................... F16L 41/06 137/318 |
| 5,312,137 | A | * | 5/1994 | Nee ..................... F16L 23/167 285/14 |
| 5,353,831 | A | * | 10/1994 | Roth .................... F16L 41/065 137/318 |
| 5,489,124 | A | * | 2/1996 | Nee ..................... F16L 23/167 285/14 |
| 5,524,661 | A | * | 6/1996 | Tigerholm .............. F16L 55/12 137/15.15 |
| 5,646,352 | A | * | 7/1997 | Joseph ................ G01L 19/0023 285/197 |
| 5,896,885 | A | | 4/1999 | Svetlik |
| 5,971,001 | A | * | 10/1999 | Andersson ............. F16L 41/06 137/15.12 |
| 6,914,531 | B1 | * | 7/2005 | Young .................... A62C 35/68 340/606 |
| 8,495,986 | B2 | * | 7/2013 | Reba ........................ B23P 6/00 123/470 |
| 9,335,189 | B2 | * | 5/2016 | Postberg ............... F16L 41/008 |
| 9,335,233 | B2 | | 5/2016 | Khalifa et al. |
| 10,215,597 | B2 | * | 2/2019 | Gagne .................... G01F 15/14 |
| 10,267,701 | B2 | * | 4/2019 | Gagne .................... G01N 27/10 |
| 2016/0018282 | A1 | * | 1/2016 | Kimyae ................ F16L 41/065 73/40 |

FOREIGN PATENT DOCUMENTS

| | | | | |
|---|---|---|---|---|
| FR | 1356042 | A | * | 3/1964 ............. A01J 5/044 |
| GB | 723209 | A | * | 2/1955 ........... F16L 41/008 |

* cited by examiner

PRESSURE INDICATING MECHANICAL TEE

BACKGROUND

1. Field of the Invention

The present application relates to a mechanical tee used in creating branches in pipes, and more particularly to a mechanical tee having a pressure indicating device used to indicate suitable pressure in a particular branch of the pipes.

2. Description of Related Art

In residential and commercial structures, it is common to run various types of hollow tubed lines. These lines carry mainly gas or water. In commercial buildings, it is common to use metal lines to run sprinkler lines. Lines are routed to provide adequate service to the various parts of the building. This involves having one or more lines routed off a main line. Branches are formed off main lines to reach or spread throughout the building. When branching a line, it is common to use a mechanical tee. The tee wraps around an existing line and provides a fitting to attach a new line to. A hole is created in the existing line within the space of the new fitting of the mechanical tee to allow the water/gas to flow into the new branch.

An issue with existing mechanical tees is that there is no real way to test to ensure all the steps were taken to ensure a proper installation. For example, it is not uncommon that an installer would try and cut corners by avoiding having to create the hole in the existing line. Once a mechanical tee is installed, the hole is covered and inspectors are unable to inspect and see if the hole was in fact created. Pressure tests of the overall system are not adequate because such tests don't in fact test each branch, but merely provide information for parts that are in fluid communication with the main. If the hole is not created in the existing line during installation of the mechanical tee, water/gas never enters that new branch. In the case for sprinkler systems where there is no valve or equipment at the end of the line designed to frequently use the water/gas, discovering the improper installation is extremely difficult. The improper installation is typically not discovered until the system is needed. In the case of a sprinkler system, that time is too late.

Although strides have been made to make the process of laying and joining pipe easier over time, such improvements have had little benefit to assisting the inspection of such installation work. A system and/or device is needed that provides an immediate and localized indication regarding the presence and pressure level of water or gas in a pipe.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
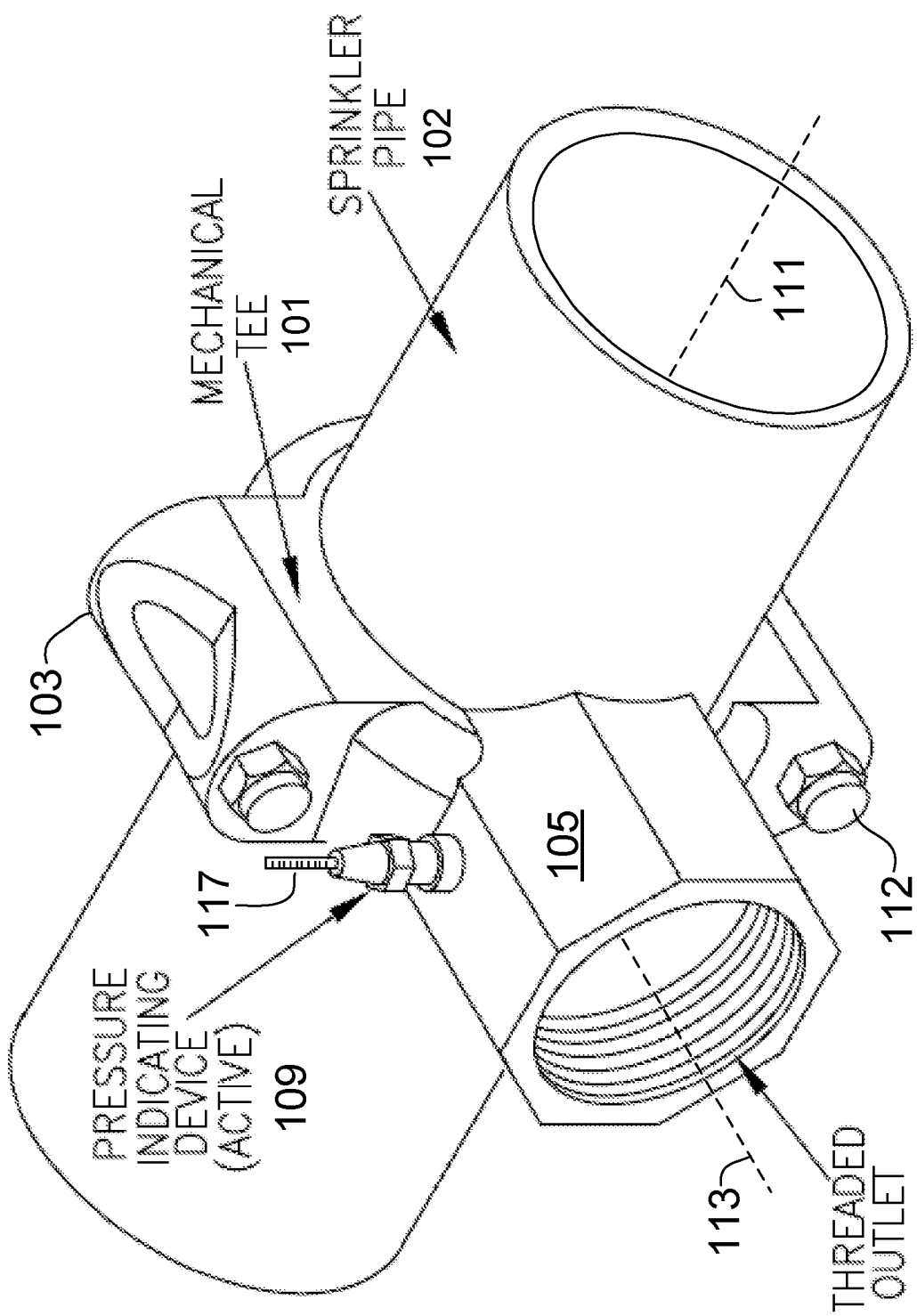
FIG. 1 is a perspective view of a pressure indicating mechanical tee according to an embodiment of the present application.

While the device and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The device and method in accordance with the present application overcomes one or more of the above-discussed problems commonly associated with inspecting water lines. In particular, the device is configured to provide a localized indicator within a branch line run off an existing line. The indicator is used by the inspectors to ascertain if there is sufficient pressure in the branch via visual inspection. Additionally the system is optionally configured to selectively couple to a monitoring system to permit an operator to continuously monitor the pressure within a particular branch of piping. These and other unique features of the device and system are discussed below and illustrated in the accompanying drawings.

The device and method will be understood, both as to its structure and operation, from the accompanying drawings, taken in conjunction with the accompanying description. Several embodiments of the device may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The device and method of the present application is illustrated in the associated drawings. The device includes a collar portion configured to extend around an existing pipe. Further included is a neck portion integrally formed with the collar portion. The neck portion extends from the collar portion and provides an interface for attaching a secondary pipe. The neck portion includes a hollow central channel. A seal is included to prevent leakage of the fluid in the pipes and is located between the collar portion and the central channel. A pressure indicating device is in communication with the central channel and designed to respond to pressure levels within the secondary pipe and provide a visually perceptible indicator for inspection. Additional features and functions of the device are illustrated and discussed below.

Referring now to the drawings wherein like reference characters identify corresponding or similar elements in form and function throughout the several views. FIG. 1 illustrates a perspective view of a pressure indicating mechanical tee 101 of the present application. Tee 101 includes a collar portion 103, a neck portion 105, a seal 107, and a pressure indicating device 109, together of which are designed to provide a visual indication of the level of pressure exerted within a pipe. Pipe 102 is an existing pipe or supply pipe for a run of water or gas. The pipes are ideally suited for running water or gas under pressure. Tee 101 is compatible in operation with either gas or water lines. For purposes of this application, the features and functions of tee 101 will be described with respect to a water line for the installation of a sprinkler system in a building.

Collar portion 103 is configured to extend around pipe 102. Portion 103 defines an axis 111 that is concentric to that of pipe 102. One or more fasteners 112 are included with portion 103 to secure tee 101 to pipe 102. Neck portion 105 is integrally formed with collar portion 103. It is understood that some embodiments may permit portions 105 and 103 to be releasably coupled in alternative embodiments. Portion 105 extends out from collar portion 103 at a defined angle as measured between an axis 113 and that of axis 111. As depicted in FIG. 1, neck portion 105 is perpendicular to axis 111. Other embodiments may provide wherein the angle between axis 111 and axis 113 is acute. Neck portion 105 is configured to provide for a means of attachment for a secondary pipe. As seen in FIG. 1, an exemplary method is to use threaded connections.

Neck portion 105 further includes a hollowed central channel 115 along axis 113. Portion 105 has a first end and a second end. The first end (internal end) is located adjacent to collar portion 103. The second end (external end) is distal to the first end. Channel 115 is configured to pass through neck portion 105 between the first end and the second end along axis 113. Channel 115 includes the threaded connections.

Pressure indicating device 109 is in communication with neck portion 105 and in particular with channel 115. Device 109 is configured to provide an indication of the presence and amount of pressure within channel 115. The precise method of indicating the presence of a pressure level in channel 115 can conceivably take many forms. It is desired that the type of indication be preferably visual in nature, avoid the need of electrical power (except when coupled to an optional monitoring system), and be continuously operable.

Figure 2:
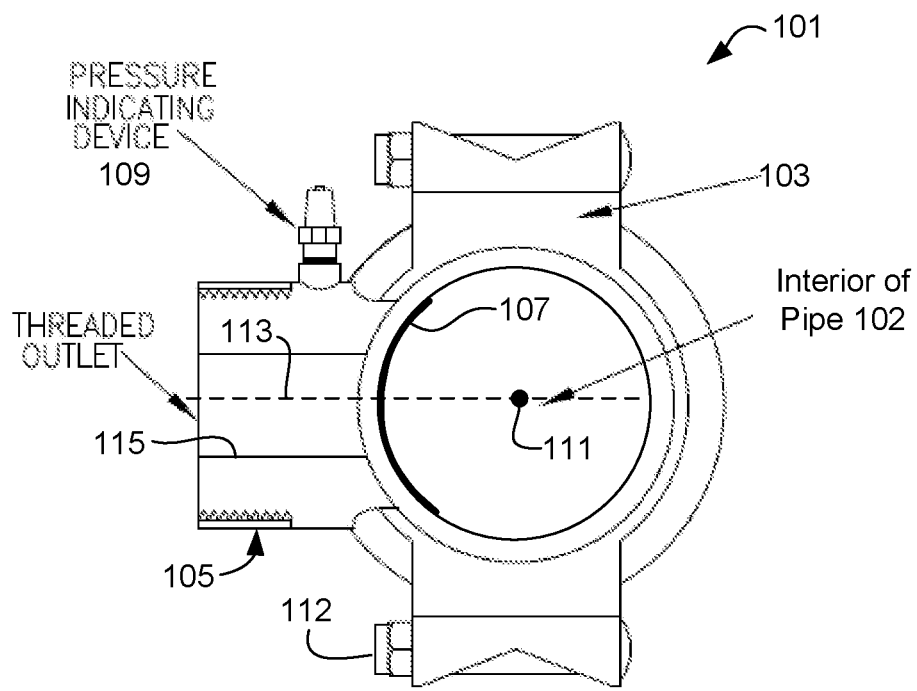
FIG. 2 is a side view of the pressure indicating mechanical tee of FIG. 1.
Figure 3:
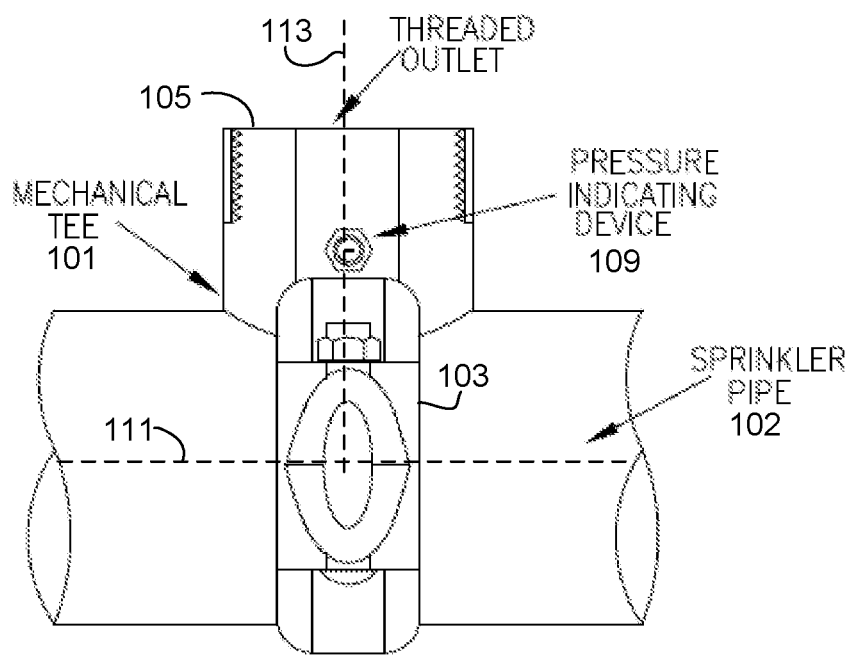
FIG. 3 is a top view of the pressure indicating mechanical tee of FIG. 2.

Referring now also to FIGS. 2 and 3 in the drawings, a side and top view of tee 101 in FIG. 101 is illustrated. Of particular note here is the difference in device 109. As depicted, device 109 includes an indicator 117 that is visually perceptible. Indicator 117 is shown in an extended position in FIG. 1 and in a retracted position in FIG. 2. In this embodiment, indicator moves upward into an extended position when pressure is supplied into the secondary pipe, or neck portion 105, from pipe 102.

Figure 4:
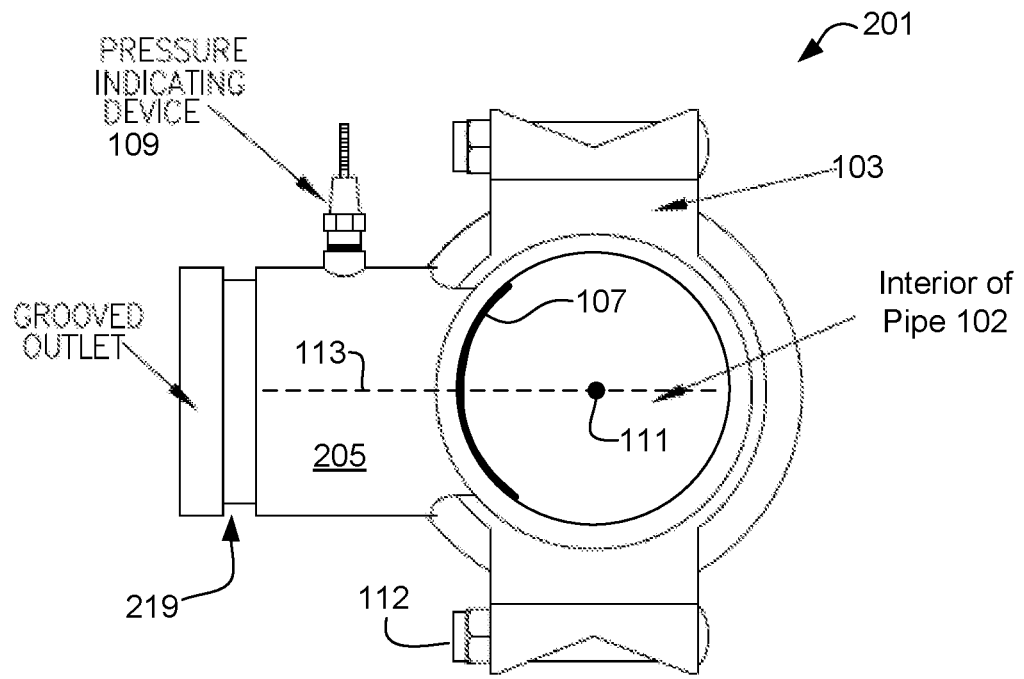
FIG. 4 is side view of an alternative embodiment of the pressure indicating mechanical tee of FIG. 1.
Figure 5:
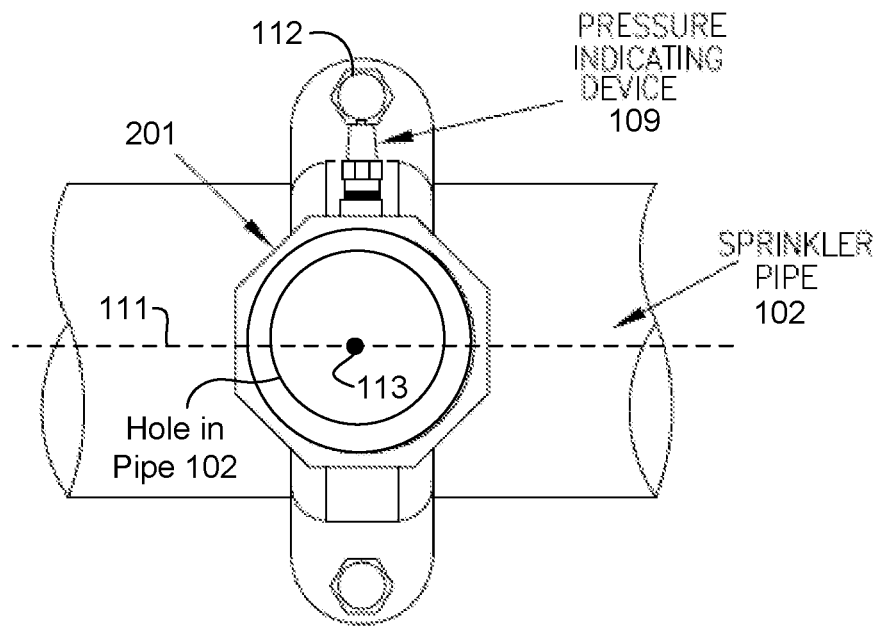
FIG. 5 is a front view of the pressure indicating mechanical tee of FIG. 4.

Referring now also to FIGS. 4 and 5 in the drawings, a side and front view of an alternative embodiment of tee 101 is illustrated. Pressure indicating mechanical tee 201 is shown. Tee 201 is similar in form and function to that of tee 101 in all respects except as herein described. Tee 201 is configured to have neck portion 205 adapted for accepting a different method of attachment for a secondary pipe. The second end of channel 215 is configured to be without internal threads and in place of the threads use a grooved end, having a groove 219. Again, this serves as disclosure of another exemplary method in which the neck portion may be adapted for attachment to a secondary pipe.

Also seen in FIGS. 2 and 4 is seal 107. Seal 107 is configured to surround channel 115 at the first end of neck portion 105. Seal 107 is configured to prevent leakage of fluid between tee 101/201 and pipe 102. In use, channel 115 is in fluid communication with that of the center of pipe 102. Seal 107 presses against an outer surface of pipe 102 and may bulge inward into pipe 102. Although shown as being visible when looking axially through pipe 102, it is understood that seal 107 may not always be visible in such a manner.

Figures 6A, 6B, 6C:
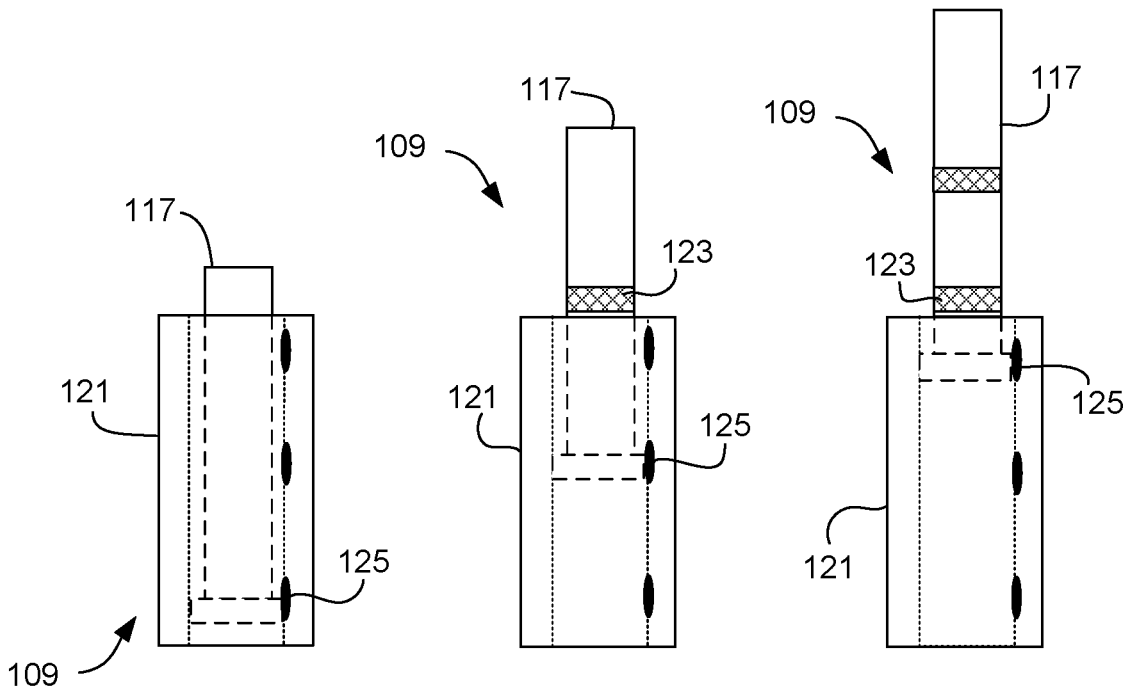
FIGS. 6A-6C are side views of an exemplary indicator used in the pressure indicating mechanical tee of FIGS. 1 and 3.

Referring now also to FIGS. 6A-6C in the drawings, enlarged side views of pressure indicating device 109 is illustrated. Viewing and referencing the associated views assists in understanding how indicator 117 may be used upon visual inspection to provide an operator with information related to the pressure detected in channel 115.

Device 109 includes a housing 121 wherein indicator 117 is configured to translate up through a portion of such housing. It should be mentioned that the precise method of integrating indicator 117 within housing 121 is not herein limited to that described. Indicator 117 is configured to move in proportion to an amount of pressure in tee 101, or in particular with channel 115. Pressure may be applied to a bottom surface of indicator 117 as depicted. Other forms of causing movement of indicator 117 are possible.

In FIG. 6A, indicator 117 is located in a first position, a retracted position. FIGS. 6B and 6C illustrate indicator 117 in different extended positions. Indicator 117 is configured to alternate between the first position and a second position (an extended position). As seen from FIGS. 6A-6C, it is understood that indicator 117 may be configured to provide more than two positions. In fact, indicator 117 is configured to indicate a plurality of set pressure levels within channel 115.

A need for an inspector is to see that there is sufficient pressure in the lines at that particular point. An indication of suitable pressure confirms that a hole was in fact made in the side of pipe 102 during installation to allow pipe 102 and channel 115 to be in fluid communication with each other.

To help with making such determination, indicator 117 is configured to move upon the reaching of a set pressure level in channel 115. For example, if 80 psi were needed to operate the sprinkler lines, device 109 would be configured to have indicator 117 automatically transition from the first position (FIG. 6A) to the second position (FIG. 6B) as that pressure level is reached. The first position is maintained when the pressure in channel 115 is below the set pressure level (i.e. 80 psi in the example). As long as the pressure is at least 80 psi, the second position is maintained. Upon inspection, when the water has been turned on in the lines, an inspector can merely walk around the building and visually inspect the indicators to ensure they are located in the second position. If pressure drops below the set pressure level, indicator 117 is configured to transition back to the first position. This helps inspectors in subsequent inspections continue to ensure sufficient pressure is maintained in any give branch of line. It becomes evident that indicator 117 then provides an indication as to a particular pressure range and not the exact pressure reading.

As state previously, more than two positions are possible. As seen with FIG. 6C, indicator 117 may extend to a third position. Transitioning between the second and third positions operates similar to that of transitions between the first and second positions. When a particular set pressure level is reached, indicator 117 automatically transitions between the second and third position. An example of using a third position is when an operator wishes to sub-divide the acceptable operating pressure range of the pipe so as to provide an indication of a more precise pressure reading. The third position may warn that the pressure in the pipe is unusually high.

In either of the second and third positions, indicator 117 may include a marker 123 that provides increased visual perception for the operator. Marker 123 may be a reflective strip, colored section, or textured area on indicator 117. Marker serves to enhance the visibility of each position to the operator/inspector.

Figure 7:
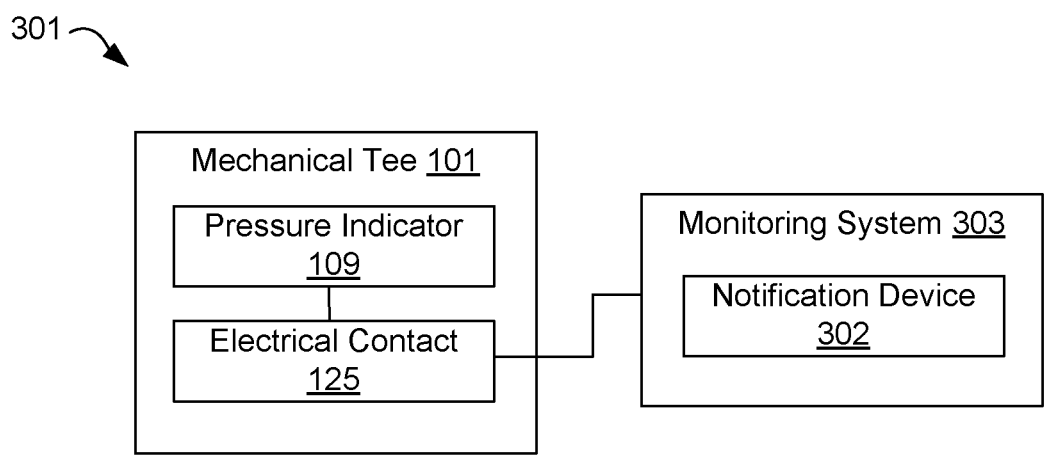
FIG. 7 is a schematic of a system using the pressure indicating mechanical tee of FIG. 1.

Referring now also to FIG. 7 in the drawings, a schematic of tee 101 used within a system 301 is illustrated. System 301 combines the use of tee 101/201 and that of a monitoring system. System 301 is configured to track or monitor the pressure levels in each branch of piping by receiving electrical communication from device 109. The communication may be relayed through a notification device 302 so as to display or communicate the pressure status of each branch of pipe in real time. For example, device 109 may include an electrical contact 125 (See FIGS. 6A-6C). As indicator 117 rests at each position, electrical contact 125 may send a corresponding electrical signal to a monitoring device 303.

In operation, an operator locates a run of pipes and determines where a tee is needed. A hole is formed in the side of pipe 102 and tee 101 is installed such that channel 115 corresponds to the location of the hole. Tee 101 is secured through fasteners 112. Additional secondary pipes are attached to the external end of neck portion 105 as needed. During inspection, the inspector turns on the water and can walk the building to visually inspect device 109 to ensure that the work was performed correctly and that each branch receives fluid as needed. There is no need to turn water on and off multiple times. The inspections may occur during customary pressure tests to ensure no leaks are present. These tests can take several hours.

The current application has many advantages over the prior art including at least the following: (1) a pressure indicating device designed to provide visual indication related to the existence of pressure within a branch of pipe; (2) automatic transitioning of the indicator between positions; (3) optional use of electrical contacts; and (4) monitoring by a monitoring device and corresponding notification system.

The particular embodiments disclosed above are illustrative only and are not intended to be exhaustive or to limit the invention to the precise form disclosed, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A mechanical tee device, comprising:
    a collar portion configured to extend around a pipe, the collar portion defining an axis and including one or more fasteners;
    a neck portion integrally formed with the collar portion, the neck portion extending out from a side of the collar portion thereby having an internal end adjacent the collar portion and an external end distal to the internal end, the neck portion having a hollow central channel extending axially between the internal end and the distal end;
    a seal surrounding the central channel at the internal end; and
    a pressure indicating device directly attached to the neck portion and the central channel, the pressure indicating device being configured to indicate the presence a pressure level within the central channel via a translating indicator that automatically alternates between a first position and a second position depending on the pressure level within the central channel, the indicator moves between positions as pressure levels within the central channel reach a set pressure level, the pressure indicating device further including an electrical contact.

2. The device of claim 1, wherein the neck portion extends perpendicularly to the axis.

3. The device of claim 1, wherein the neck portion extends from the collar portion at an acute angle relative to the axis.

4. The device of claim 1, wherein the first position is maintained below a set pressure level and the second position being maintained at or above a set pressure level.

5. The device of claim 1, wherein the indicator is configured to automatically transition from the first position to the second position when pressure in the central channel is at or above a set pressure level.

6. The device of claim 1, wherein the indicator is configured to automatically reset back to the first position when pressure in the central channel drops below a set pressure level.

7. The device of claim 1, wherein each of the positions of the indicator represent a pressure range.

8. The device of claim 1, wherein the pressure indicating device is configured to indicate a plurality of set pressure levels within the central channel.

9. The device of claim 1, wherein the pressure indicating device includes an indicator operable between a first position and a second position, the electrical contact configured to detect the position of the indicator.

10. The device of claim 9, further comprising:
a monitoring system in communication with the electrical contact so as to receive a signal indicating the pressure level in the central channel.

11. The device of claim 9, wherein the monitoring system is configured to provide a notification to a user related to the pressure level in the central channel.

12. The device of claim 1, further comprising:
a monitoring system in communication with the pressure indicating device to monitor the pressure levels in the central channel.

13. A mechanical tee device, comprising:
a collar portion configured to extend around a pipe, the collar portion defining an axis and including one or more fasteners;
a neck portion integrally formed with the collar portion, the neck portion extending out from a side of the collar portion thereby having an internal end adjacent the collar portion and an external end distal to the internal end, the neck portion having a hollow central channel extending axially between the internal end and the distal end;
a seal surrounding the central channel at the internal end;
a pressure indicating device directly attached to the neck portion and the central channel, the pressure indicating device being configured to indicate the presence a pressure level within the central channel;
a translating indicator within the pressure indicating device that automatically alternates between a first position and a second position depending on the pressure level within the central channel, the indicator moves between positions as pressure levels within the central channel reach a set pressure level;
an electrical contact within the pressure indicating device configured to detect the position of the indicator; and
a monitoring system in communication with the electrical contact so as to receive a signal indicating the pressure level in the central channel.

* * * * *